US005281782A

United States Patent [19]

Conatser

[11] Patent Number: 5,281,782

[45] Date of Patent: Jan. 25, 1994

[54] DIAPHRAGM PRESSURE SWITCH

[75] Inventor: Roger L. Conatser, Brentwood, Tenn.

[73] Assignee: Campbell Hausfeld, Mt. Juliet, Tenn.

[21] Appl. No.: 875,057

[22] Filed: Apr. 28, 1992

[51] Int. Cl.[5] ......................... F16J 3/00; H01H 35/40

[52] U.S. Cl. ......................................... 200/83 J; 92/96; 200/83 B

[58] Field of Search .......................... 200/83 R-83 W; 92/96-104

[56] References Cited

U.S. PATENT DOCUMENTS

| | | | |
|---|---|---|---|
| 2,748,218 | 5/1956 | Leichsenring | 200/83 V |
| 2,808,484 | 10/1957 | Beck et al. | 200/83 B |
| 3,286,059 | 11/1966 | Griffith et al. | 200/83 Y |
| 3,307,000 | 2/1967 | Ekey | 200/83 Y |
| 3,466,978 | 9/1969 | Carlstedt | 92/95 |
| 3,585,328 | 6/1971 | Fiore et al. | 337/320 |
| 3,738,776 | 6/1973 | Debare | 417/38 |
| 3,816,025 | 6/1974 | O'Neill | 417/9 |
| 4,090,048 | 5/1978 | Brightman | 200/83 N |
| 4,217,783 | 8/1980 | Ito et al. | 338/4 |
| 4,267,413 | 5/1981 | Reis | 200/81.4 |
| 4,295,116 | 10/1981 | Studlien | 338/4 |
| 4,355,761 | 10/1982 | Bjorn et al. | 239/126 |
| 4,469,923 | 9/1984 | Charboneau | 200/83 P |
| 4,722,230 | 2/1988 | Krohn | 73/756 |
| 4,770,045 | 9/1988 | Nakagawa et al. | 73/726 |
| 4,918,833 | 4/1990 | Allard et al. | 29/621.1 |
| 4,932,265 | 6/1990 | Skuratovsky et al. | 73/727 |

*Primary Examiner*—J. R. Scott

*Attorney, Agent, or Firm*—Wood, Herron & Evans

[57] ABSTRACT

A diaphragm for a diaphragm pressure switch used to sense paint pressure in an airless, piston-type paint spray gun includes a disc-shaped, deflectable, chemically-inert primary member and a washer-shaped, secondary, resilient member located behind the primary member. The switch includes a hollow body which connects to the spray gun to form a sensing zone therebetween. The switch body houses a spring-biased, linearly displaceable piston with a head which extends through an opening in the body. The primary member of the diaphragm has a first surface exposed to paint in the sensing zone and a second surface with a central region which contacts the piston head. High pressure in the sensing zone deflects the primary member, and deflection of the primary member displaces the piston. The chemically inert primary member withstands the chemically-corrosive effects of solvents in the paint. The secondary member besides between the primary member and the switch body and circumscribes the piston head, thereby eliminating stress on the primary member caused by sharp edges of the piston head.

12 Claims, 1 Drawing Sheet

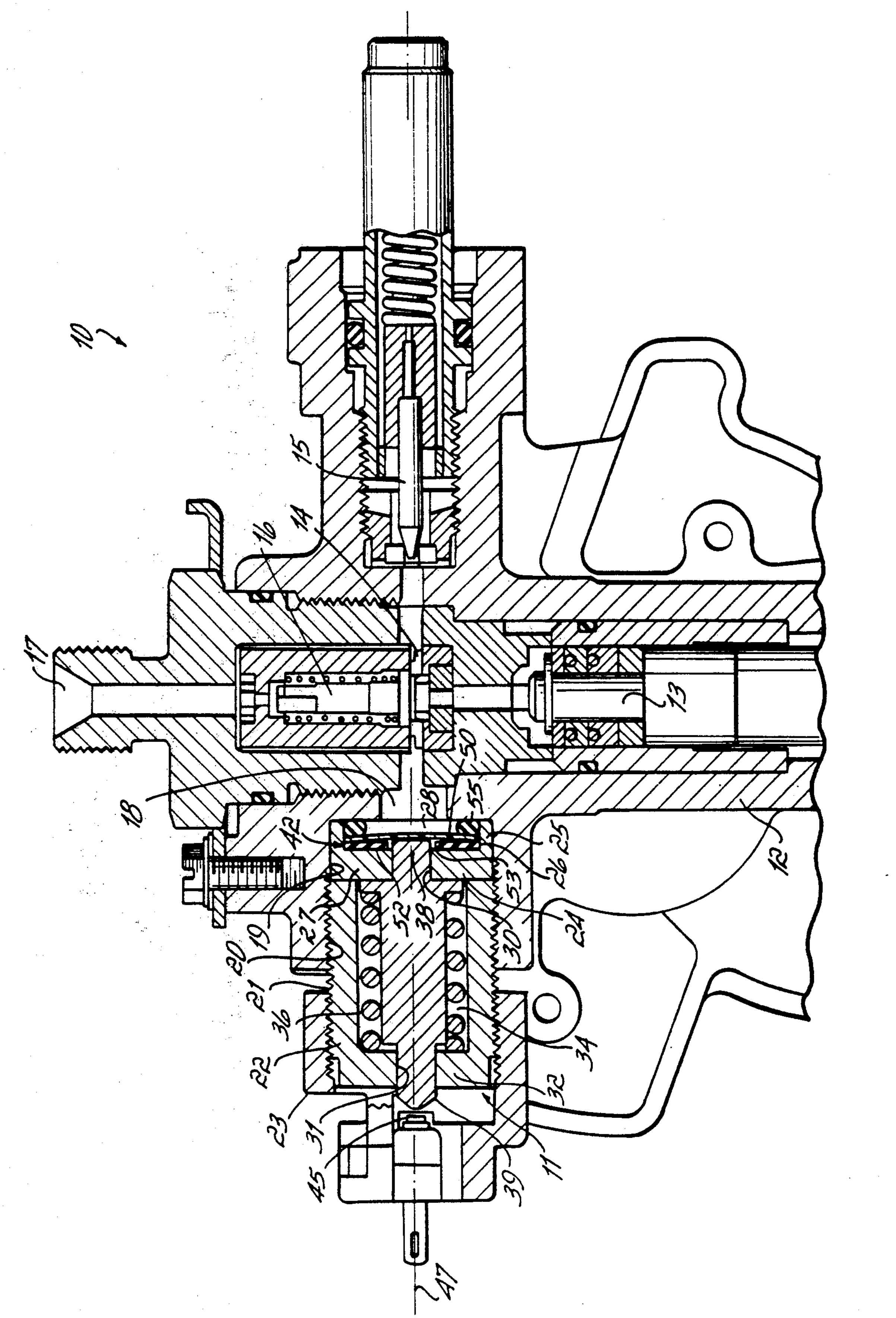
10
15
14
16
17
13
18
50
55
28
42
25
26
12
53
52
38
24
30
19
27
20
21
36
34
22
32
23
31
11
45
39
47

DIAPHRAGM PRESSURE SWITCH

This invention relates to a diaphragm pressure switch. More particularly, this invention relates to a diaphragm pressure switch for sensing paint pressure in an airless, piston-type paint spray gun.

BACKGROUND OF THE INVENTION

In an airless, piston-type paint spray gun, a piston pumps the paint from a supply line and into a paint holding chamber. The gun has a trigger which, when depressed, opens a valve to cause the pressurized paint in the chamber to be sprayed out of a nozzle in the direction of a surface to be coated.

For ideal spraying conditions, the pressure of the paint in the chamber should be in the range of about 1800–2100 p.s.i. This pressure range is maintained by controlling the operation of a motor which drives the piston pump. More particularly, a diaphragm pressure switch senses the fluid pressure of the paint in the chamber, and in response, generates a signal to the motor to either start or stop the piston. According to a typical sequence of operation, the chamber is initially empty, and therefore the fluid pressure is zero. A "pump" signal to the motor causes the piston pump to begin, thereby commencing priming of the pump. During priming, an electrical contact of the diaphragm pressure switch remains in a normally-closed position. The contact is in series with a conductive lead which conveys the pump signal to the motor. At a predetermined pressure, i.e. an upper limit for paint pressure in the chamber, a diaphragm in the switch deflects to displace a spring-biased piston and open a piston, thereby opening the normally-closed electrical contact. Opening of the electrical contact terminates the pump signal to the motor and de-energizes the pump.

Thereafter, when the trigger is depressed, pressurized paint from the chamber will be expelled through the nozzle. As a result, the fluid pressure of the paint in the chamber decreases. At a predetermined lower limit for paint pressure in the chamber, i.e. about 1700 p.s.i., the diaphragm begins to move toward its original position, and the piston moves with the diaphragm, due to the spring. Eventually, the diaphragm and piston move a sufficient distance to close the contact and deactivate the switch, thus restarting the motor which drives the pump. The pump operates until the pressure diaphragm switch again senses that the upper pressure limit has been reached, whereupon the contact again opens to disconnect the pump. In this manner, the switch provides continuous, cyclical control of the motor which drives the pump.

The pressure diaphragm switch plays an important role in maintaining sufficient spraying pressure for an airless, piston-type spray gun. In one common diaphragm pressure switch, opening of the electrical contact is caused by mechanical contact with one end of a switch piston. An opposite end of the piston contacts the rear surface of a deflectable diaphragm. The front surface of the diaphragm contacts the fluid to be sensed. The diaphragm has a diameter which is greater than that of the piston head. The diaphragm spans across a recess in the forward end of a hollow, cylindrical switch body. In use, the recess is in fluid communication with the paint chamber, and the diaphragm deflects according to the fluid pressure of the paint in the recess. The switch body houses the piston and a spring. The head of the piston extends through an opening in a transverse wall at a forward end of the switch body. The spring biases the piston head into contact with the back surface of the diaphragm.

For an airless, piston-type paint spray gun, it is desirable to provide a diaphragm pressure switch which outlasts the useful life of the spray gun, thereby eliminating the need for replacement or servicing of parts. Unfortunately, the structural and environmental requirements for the diaphragm of a diaphragm pressure switch have proved that this objective is more easily stated than attained.

More particularly, the diaphragm must deflect with changes in fluid pressure in a manner which is predictable and repeatable, within the necessary pressure ranges, for its entire useful life. Because the deflection of the diaphragm must displace a piston, the diaphragm must be of a relatively sturdy material. Moreover, for optimum accuracy and repeatability in fluid pressure sensing, it is also desirable to locate the diaphragm in direct fluid contact with the paint in the chamber. Unfortunately, because of the chemically-corrosive nature of many types of paint, a diaphragm for use in an airless, piston-type paint spray gun must be made of a material which is chemically inert, or not susceptible to chemical corrosion from the paint.

These diverse requirements limit the number of materials which are suitable for use in a pressure diaphragm switch. Rubber is a suitable diaphragm material from the standpoint of both deflectability and relatively low cost. However, rubber is particularly susceptible to chemical corrosion from paint solvents. Rigid plastic has also been used in the past as a diaphragm material. Unfortunately, when contacting sharp metal edges such as the side edges of a switch piston, these rigid plastics tend to extrude around the edges of the piston.

Prior attempts to combine two diverse materials in a single diaphragm have also failed. One attempt involved a diaphragm which included a rigid plastic layer in direct contact with the paint and a backing layer of rubber located between the switch body and the plastic layer. Unfortunately, this two-component diaphragm needed repair after only six hours of use. By comparison, the normal useful life of an airless, piston-type paint spray gun is about 75 hours.

One problem with this particular two-component diaphragm related directly to the relatively high pressures used in this type of paint spray gun. More specifically, at above 1000 p.s.i., the rubber backing layer became squeezed to a paper thin width between the plastic layer and the piston, causing the excess rubber to move outwardly from therebetween and obstruct or inhibit normal movement of the piston, particularly in returning to its original, undeflected position, and thereby reducing the sensitivity of the switch. In some cases, the diaphragm and piston did not return to their undeflected positions until the fluid pressure had lowered to about 1000 p.s.i., resulting in a hysterisis range for the switch of about 800 to 1000 p.s.i. While some hysterisis for a diaphragm pressure switch is acceptable, this amount of hysterisis for the diaphragm pressure switch used in a piston-type paint spray gun is too great. Due to this hysterisis, the electrical contact remains open too long, and the pump is not energized quickly enough to sufficiently pressurize the paint in the chamber for adequate spraying when spraying is resumed.

It is an objective of the invention to extend the useful life of a diaphragm for a pressure diaphragm switch beyond the useful life of an airless, piston-type paint spray gun in which it is used.

It is another objective of the invention to reduce the fluid pressure hysterisis of a diaphragm pressure switch used in an airless, piston-type paint spray gun.

It is still another objective of the invention to minimize the effects of chemical corrosion, the cost and the pressure susceptibility of a diaphragm used in a pressure diaphragm switch.

The objectives of this invention are met by a diaphragm for a diaphragm pressure switch which includes a deflectable, chemically-inert primary member which is disc-shaped and made of rigid plastic and a resilient, ring-shaped, secondary member for supporting the primary member. The resilient, washer-shaped secondary member supports the periphery of the rear surface of the primary member around the outside of the piston head.

The primary member is rigid plastic, to withstand chemical corrosion from direct contact with paint solvents and also to shield the rubber secondary member from contact with the paint. At the same time, the rubber secondary diaphragm provides resilient support for the deflectable primary member, thereby eliminating stress on the primary member caused by the sharp edges of the piston and reducing the susceptibility to undesired extrusion of the primary member around the sharp edges of the piston under high pressure conditions.

Under normal operating conditions, i.e. paint chamber pressures ranging from 0-2700 p.s.i., the dual component diaphragm structure of this invention extends the useful life of a diaphragm pressure switch beyond the useful life of an airless, piston-type paint spray gun in which it is used. For a useful life which exceeds the normal seventy-five-hour life span of a paint spray gun, a pressure diaphragm switch equipped with this dual component diaphragm is capable of accurately sensing paint pressure and effectively controlling the operation of the piston pump. During its useful life, the hysterisis of this dual component diaphragm remains relatively constant, in the range of about 300-400 p.s.i. Thus, with this diaphragm, the switch may be set to accurately and repeatably turn off the piston pump when pressure in the chamber reaches 2000-2400 p.s.i. and to turn on the piston pump again when the paint pressure falls to about 1600-1700 p.s.i.

According to a preferred embodiment, this dual component diaphragm is located within a recess at a forward end of a hollow, cylindrical switch body. The switch body connects to the pump housing to place the recess in fluid communication with the paint chamber. Together, the recess and the chamber from a fluid sensing zone. The dual component diaphragm defines one end of the sensing zone. The diaphragm deflects with changes in the fluid pressure of the paint in the chamber. Because a central region of the primary member contacts the head of a linearly displaceable, spring-biased piston, the diaphragm deflections displace the piston. This piston displacement opens a normally-closed electrical contact in the diaphragm pressure switch, thereby de-energizing the motor which drives the piston pump.

With this switch, the distance between the piston and the contact may be varied to change the desired upper pressure limit for de-energizing the motor. Preferably, during painting, the paint pressure in the chamber should be maintained at about 1800-2100 p.s.i.

These and other features of the invention will be more readily understood in view of the following detailed description and the drawing.

BRIEF DESCRIPTION OF THE DRAWINGS

The Figure is a cross-sectional view of a pump which includes pressure sensor switch in accordance with a preferred embodiment of the invention.

DETAILED DESCRIPTION OF THE DRAWINGS

The Figure shows in, cross-sectional view, a pump 10 which includes a diaphragm pressure switch 11 in accordance with a preferred embodiment of the invention. This pump 10 is particularly suitable for paint spraying. The pump includes a pump body 12, a pump piston 13, a pumping chamber 14, a pressure relief valve 15, an outlet valve 16 and an outlet nozzle 17.

The diaphragm pressure switch 11 mounts to the pump body 12. The pump body 12 includes a port 18 in fluid communication with the pumping chamber 14. On an opposite side of the port 18, the pump body 12 has an enlarged diameter opening 19. The opening 19 has internal threads 20 which cooperate with external threads 21 of a switch body 22 which is sized to be threadably received within the opening 19. A cup-shaped switch bracket 2 threadably connects to the external threads 21 of the switch body 22.

The switch body 22 preferably has a two piece construction and includes a first interior end 24 which contacts the pump body 12 and surrounds the port 18. Preferably, the switch body 22 has a diaphragm retainer 27 with a peripheral shoulder 25 which defines a recess 26 located at first end 24. The shoulder 25 is annular in shape, and the recess 26 is disc-shaped. In combination, the port 18 and the recess 26 define a fluid pressure sensing zone 28 which is in fluid communication with the pumping chamber 14.

The switch body 22 is generally cylindrical in shape, with a first opening 30 at the interior end 24 and a second opening 31 at a second, exterior end 32. The body 22 includes an interior hollow-volume 34 which houses a switch piston 35 and a spring 36. The spring 36 biases the piston 35 toward first end 24. The piston 35 has a head 38 at a first end thereof which extends through opening 30 and into recess 26 and a second end 39 which extends through opening 31 and outside the second end 32 of switch body 22. The first and second ends, 38 and 39, of the piston 35 are sized to be slidable within the openings, 30 and 31, respectively, of the switch body 22.

A multi-component diaphragm, designated in general by reference numeral 42 extends across recess 26 at the first end 24 of switch body 22. The diaphragm 42 deflects inwardly or outwardly in response to fluid pressure variations in the sensing zone 28. This deflecting causes linear movement of switch piston 35, which results in the second end 39 actuating a contact 45 mounted to the switch bracket 23. While a number of different contacts 45 would work for the intended purpose, applicant has used a normally closed microswitch sold by Honeywell and identified by part number 141SN3-H4. When actuated by the piston 35, the contact 45 opens to disconnect a motor (not shown) which drives the pump piston 13. Preferably, the port 18, the diaphragm 42, the first opening 30, the second opening 31, the piston 35 and the contact 45 are aligned axially along an axis 47.

In more specific detail, the diaphragm 42 includes a deflectable first, or primary, member 50 with an inner surface exposed to the sensing zone 28 and an outer surface with a central region in contact with the head 38 of the piston 35. The primary diaphragm member 50 preferably extends completely across the recess 26 defined by the shoulder 25 and the retainer 27. Preferably, the primary member 50 is a rigid plastic, such as a high-density polyethylene, so as to withstand the corrosive action of solvents in paint or other pumped fluids which would otherwise chemically corrode softer diaphragm materials such as rubber. The member 50 is disc-shaped and has a thickness of about 0.030" and a diameter of about 0.52", which is slightly less than the inner diameter of the shoulder 25.

The diaphragm 42 also includes a secondary backing member 52 residing between the primary member 50 and the switch body 22, radially outside of the central region. The member 52 is flat and has a ring shape, similar to a washer, with a hole 53 in the middle. The secondary diaphragm backing member 52 circumscribes the head 38 of piston 35. Preferably, the secondary member 52 is made of a soft rubber, such as nitrile, and has a thickness of about 0.030". The inner diameter of member 52 is slightly greater than the outer diameter of the piston 35, and the outer diameter is preferably equal to the outer diameter of the primary member 50, i.e. about 0.52".

Due to its composition, the secondary member 52 provides resilient support for primary member 50 and eliminates stress on the primary member 50 caused by the sharp edges of the head 38, thereby preventing undesired extrusion of the primary member 50 around the head 38 of the piston 35 at high pressures. At the same time, the primary member 50 shields the secondary member 52 from exposure to chemically corrosive solvents which would otherwise shorten the useful life of the member 52. As a result of its composition and structure, this two-component diaphragm 42 provides accurate paint pressure sensing in an airless, piston-type paint spray gun for a time period which is longer than the average useful life of the paint spray gun. In short, the diaphragm 42 enables the switch 11 to outlive the pump 10.

The pump 10 also includes an O-ring 55 which is located radially inside of the shoulder 25 and held in axial compression between the pump body 12 and the switch body 22, thereby to enclose and seal the sensing zone 28. The O-ring 55 also holds the primary diaphragm member 50 in contact with the piston 35. Preferably, the primary and secondary diaphragm members, 50 and 52, have the same diameter so that an outer peripheral portion of the primary member 50, i.e. outside the central region, is sandwiched between the O-ring 55 and the secondary member 52. The O-ring 55 is preferably made of nitrile.

Alternately, the O-ring 55 could be eliminated, and the dimensions of the retainer 27 could be altered by reducing its thickness and reducing the size of the shoulder 25 to a size which would allow it to be crimped over the diaphragm 42. This would eliminate any potential problems associated with chemical degradation of the O-ring 55 caused by the solvents in paint.

In operation, the piston pump 13 pumps paint into the chamber 14 to prime the pump 10. During pumping, the contact 45 of switch 11 is in a normally closed position. When the paint pressure in the chamber 14 reaches about 1500 p.s.i., the diaphragm 42 begins to deflect outwardly and inearly displace the piston 35. When pressure in the chamber reaches about 1900–2300 p.s.i., the deflection of the diaphragm 42 has moved piston 35 about 0.013–0.016", which is a sufficient distance to open the normally-closed contact 45. This shuts down the pump 13. Thereafter, when the trigger (now shown) is depressed to spray paint from the outlet nozzle 17, paint pressure in the chamber 14 will decrease. When pressure decreases to a predetermined lower level, the force of the spring 36 overcomes the fluid pressure force on the diaphragm 42, and the spring 36 move the piston 35 and the diaphragm 42 back toward their original position a sufficient distance to reactivate the switch 11. This closes contact 45 and reactivates the piston pump 13.

Because of its composition and structure, this dual component diaphragm 42 has a useful life which is greater than the expected life of the pump 10. The pressure hysterisis loop of the switch 11 remains relatively small, i.e. about 300–400 p.s.i., and relatively constant throughout the life of the pump 10. In short, despite continuous cycling of the switch 11 between on and off at relatively high pressures, and in a chemically corrosive environment, the diaphragm 42 does not have to be serviced or replaced during the normal useful life of the paint spray gun on which it is used.

From the above disclosure of the general principles of the present invention and the preceding detailed description of the preferred embodiment, those skilled in the art will readily comprehend the various modifications to which the present invention is susceptible. Therefore, we desire to be limited only by the scope of the following claims and equivalents thereof.

I claim:

1. A diaphragm system for a diaphragm pressure switch comprising:
   - a generally flat, deflectable primary member having first and second imperforate opposite sides, said first side for disposition in communication with a fluid to be sensed in a fluid sensing zone and a second opposite side having an imperforate central region for contacting a head of a switch piston, thereby to displace the piston during deflection caused by a predetermined fluid pressure in the zone; and
   - a generally flat, ring-shaped secondary member having a resilience greater than that of said primary member, said secondary member contacting the second side of the primary member around the outside of the central region, thereby to resiliently support the primary member against extrusion around said piston during deflection caused by fluid pressure variations in the zone.

2. A diaphragm system for a diaphragm pressure switch as in claim 1 wherein the primary member is made of a chemically resistant material, thereby to shield the secondary member from chemical corrosion caused by exposure to solvents in the sensing zone.

3. A diaphragm system for a diaphragm pressure switch as in claim 2 wherein the primary member is rigid plastic.

4. A diaphragm system for a diaphragm pressure switch as in claim 3 wherein the rigid plastic is high-density polyethylene.

5. A diaphragm system for a diaphragm pressure switch as in claim 2 wherein the secondary member is rubber.

6. A diaphragm system for a diaphragm pressure switch as in claim 5 wherein the rubber is nitrile.

7. A diaphragm system for a diaphragm pressure switch as in claim 1 wherein the primary member is disc-shaped in transverse cross section and the primary and the secondary members have the same outer diameter.

8. A diaphragm system for a diaphragm pressure switch for sensing fluid in a fluid pressure sensing zone comprising:

a hollow switch body having a first end in fluid communication with the fluid pressure sensing zone, the first end having an opening therethrough for access into said zone; 'a piston housed within the body and having a head at an inner end thereof sized to be received in the opening, the piston being linearly displaceable with respect to the body;

means for biasing the piston with a predetermined force to extend the head through the opening;

a deflectable diaphragm at the first end of the body, adjacent the opening, the diaphragm being deflectable to linearly displace the piston when a fluid pressure in the zone acts upon the diaphragm with a force greater than said predetermined force, the diaphragm including, a deflectable primary member with a first side for disposition in contact with the fluid in the sensing zone and a second side having a central region in contact with the piston head.

a resilient secondary member residing between the primary member and the switch body and located outside of the central region, thereby to resiliently support the first member against extrusion around said piston during deflection caused by fluid pressure variations in said sensing zone.

9. A diaphragm system for a diaphragm pressure switch as in claim 8 wherein the primary member is disc-shaped and the secondary member is ring-shaped.

10. A diaphragm system for a diaphragm pressure switch as in claim 8 wherein the sensing zone is defined by a space between the first end of the switch body and a pump housing, and further comprising:

a shoulder located at the first end of the body, the shoulder defining a recess which forms part of the sensing zone; and a resilient O-ring located radially inside of the shoulder and held in compression between the switch body and the pump housing, thereby to form a seal between the switch body and the pump housing and to hold the primary member in contact with the piston head.

11. A diaphragm system for a diaphragm pressure switch as in claim 10 wherein the primary member is disc-shaped and the secondary member is ring-shaped and said first and second members have the same outer diameter, whereby an outer peripheral portion of the primary member is sandwiched between the secondary member and the O-ring.

12. A pressure switch for sensing paint pressure in a paint chamber of an airless, piston-type paint spray gun comprising:

a hollow switch body with a first end connectable to the pump to define a pressure sensing zone between the body and the pump, the body having an opening at said first end;

a spring-biased piston housed within the body, the piston being linearly displaceable against the force of the spring to initiate a control signal, the piston having a head extending through said opening; and a deflectable diaphragm located at said first end in contact with said piston head, the diaphragm being deflectable to displace the piston when force caused by paint pressure in said zone overcomes the spring bias force on the piston, the diaphragm including, a disc-shaped, deflectable, chemically-inert primary member with a first side for disposition in contact with the paint in the zone and a second opposite side in contact with the piston head, and a secondary, ring-shaped, resilient member residing between the body and the primary member and circumscribing the piston head.

* * * * *

UNITED STATES PATENT AND TRADEMARK OFFICE

CERTIFICATE OF CORRECTION

PATENT NO. : 5,281,782

DATED : January 25, 1994

INVENTOR(S) : Roger L. Conatser

It is certified that error appears in the above-identified patent and that said Letters Patent is hereby corrected as shown below:

At column 4, line 27, after "bracket" insert -- 23 -- and delete [2].

At column 6, line 1, after "and" insert -- linearly -- and delete [inearly].

At column 6, line 11, after "spring 36" insert -- moves -- and delete [move].

At column 7, line 9, after "switch for sensing fluid" insert -- pressure --.

At column 7, line 30, after "and a second" and before "side" insert -- opposite --.

Signed and Sealed this

Twenty-sixth Day of July, 1994

Attest:

BRUCE LEHMAN

*Attesting Officer*

*Commissioner of Patents and Trademarks*